United States Patent Office 2,966,563
Patented Dec. 27, 1960

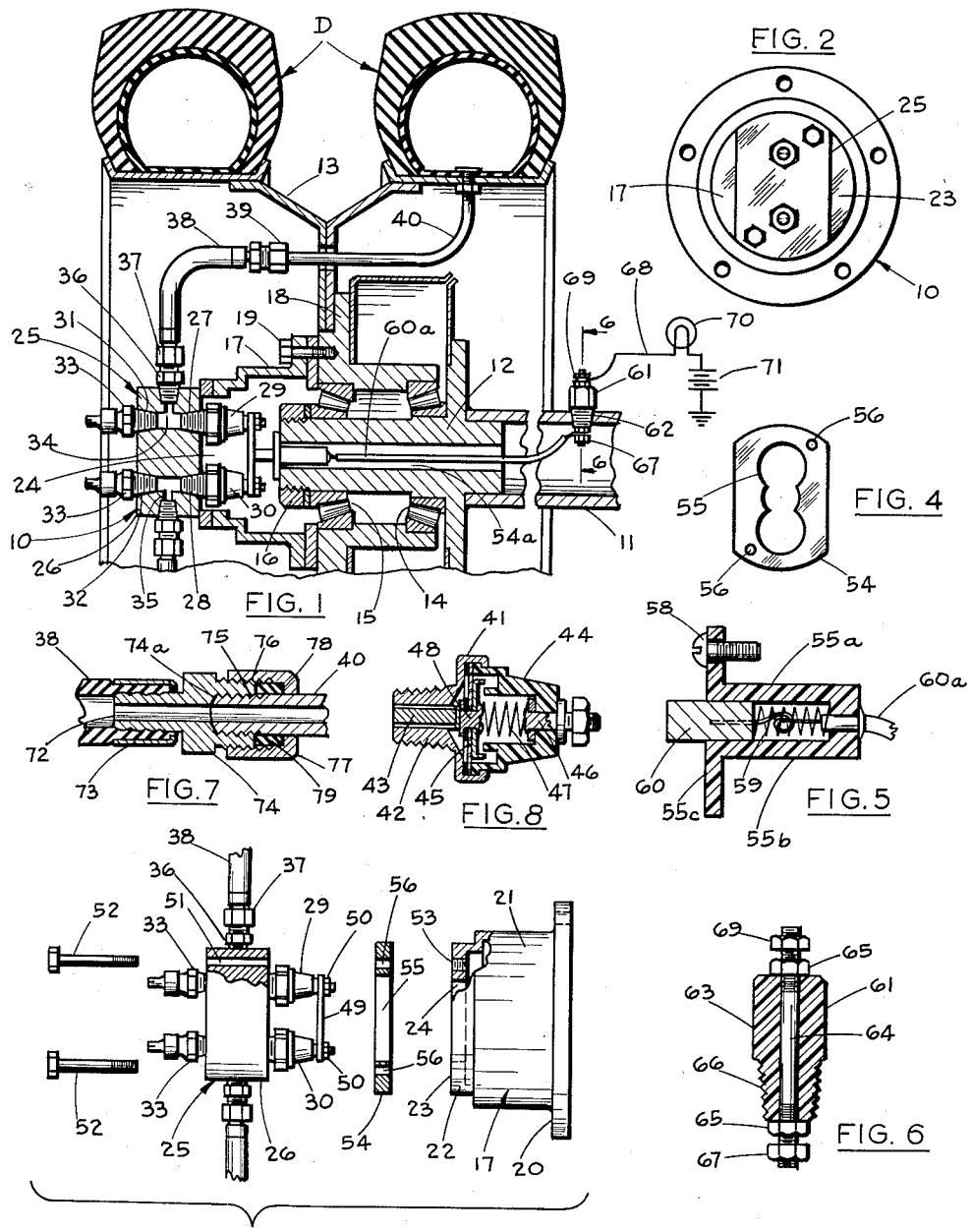

2,966,563
PRESSURE ALARM FOR DUAL TIRES
Fred R. Bobenhausen, 9231 NW. 17th Ave., Miami, Fla.
Filed July 16, 1959, Ser. No. 827,514
7 Claims. (Cl. 200—61.25)

This invention relates to low pressure indicators for pneumatic tires, and has particular reference to a low pressure alarm for a dual tire arrangement such as is common on large automotive trailers.

The present invention is an improvement over the pressure alarm device disclosed in my patent application Serial No. 320,042, filed November 12, 1952, and since abandoned. In general the invention contemplates a simple device whereby the driver or operator in the cab of a tractor trailer assembly will be instantly alerted whenever the pressure in any of the trailer's dual tires has reached a predetermined low point.

It is, therefore, a primary object of the present invention to provide a practical warning or alarm device capable of being actuated whenever any of the tires of a dual tired trailer has reached the point where its pressure must be increased or the tire otherwise attended to.

Another important object of the invention is to provide a dual tire alarm which is detachably secured to the hub portion of the trailer wheel so that it may be easily removed for repair or replacement.

A further object of the invention is to provide a dual tire alarm whereby the tires may be filled with air through valves conveniently located in an external wall of the alarm device.

Still another object is to provide an improved dual tire alarm of the character described which is readily adaptable to installation on any automotive trailer having dual tires, and which can be installed with little difficulty by an ordinary mechanic.

Another object of the invention is to provide an improved dual tire alarm of the above nature which will be comparatively low in cost, yet highly efficient, trouble-free and long wearing in operation.

Other objects, features and advantages of my invention will be apparent from the following description when read with reference to the accompanying drawings. In the drawings, wherein like reference numerals denote corresponding parts throughout the several views:

Fig. 1 is a partial vertical cross-sectional view of a trailer dual tire and axle assembly, showing a pressure alarm device embodying the invention assembled thereto, Fig. 2 is a front elevational view of the alarm device shown separately, Fig. 3 is a side elevational view showing the pressure block, spacer and mounting hub comprising the invention, separately, and in exploded relation, Fig. 4 is a front elevational view of the spacer, Fig. 5 is a cross-sectional view of the brush member, Fig. 6 is an enlarged vertical cross-sectional view of the electrical feed-through bushing, taken along the line 6—6 of Fig. 1 in the direction of the arrows, Fig. 7 is a cross-sectional view, on an enlarged scale, of a hose adapter for connecting to a tire valve stem, and Fig. 8 is a cross-sectional view of one of the pressure actuated switches.

Referring now in detail to the drawings, reference numeral 10 in Fig. 1 designates generally an improved pressure alarm for dual tires fitted to a dual tire assembly D. To illustrate a typical installation, the tire assembly D comprises a tubular axle 11, which is spring supported against the underside of the trailer frame (not illustrated) and which has fixed thereto at each end a spindle 12 upon which the double disc wheel 13 is rotatably journalled on inner and outer roller bearings 14, 15, being held in place thereon by the usual spindle nut 16.

The pressure alarm device 10 comprises a cylindrical hub cover member 17 (Figs. 1, 2, 3) which, as illustrated in Fig. 1, is adapted to be secured to the hub 18 of the wheel 13 by machine screws 19 in substitution for the original equipment hub cover. The hub cover member 17 is preferably of cast metal such as aluminum, and is integrally formed with an annular flange portion 20 adapted to seat against the annular end of the wheel hub 18, a hollow central cylindrical body portion 21, and a coaxial hollow cylindrical end portion of reduced diameter 22 having an end wall 23. As illustrated in Fig. 3, the end wall 23 of the hub cover member 17 is provided with an elongated opening 24 for receiving portions of the pressure block assembly 25, now to be described.

The pressure block assembly 25 (see Figs. 1, 2, 3) comprises a body member 26, which may be in the form of an elongated block of metal one side of which is drilled and tapped to provide a pair of symmetrically-spaced openings 27, 28, for receiving pressure switches 29, 30, therein. The opposite side of the body member 26 is provided with drilled and tapped openings 31, 32, coaxial and communicating with the openings 27, 28, respectively. Securely threaded in each of the openings 31, 32 is a valve stem fitting 33 equipped with the usual valve core for admitting and maintaining air under pressure. One end of the body member 26 is drilled and tapped, as at 34, to communicate interiorly with the openings 27, 31, and the other end of said body member is drilled and tapped, as at 35, to communicate interiorly with the openings 28, 32. Securely threaded in the opening 34 is a standard hose fitting 36. Removably secured to the hose fitting 36 by a coupling 37 is a flexible air hose 38. The other end of the air hose 38 is provided with an adapter member 39, hereinbelow described in greater detail, for connection to the valve stem 40 of one of the dual tires (the inner tire, for example, as illustrated in Fig. 1). Securely threaded in the opposite opening 35 of the body member 26 is a similar air hose assembly (not fully illustrated) connected to the valve stem (not illustrated) of the other tire, which is preferably arranged diametrically opposite the valve stem 40 for wheel balance purposes.

The pressure-actuated switches 29, 30 are identical units, and, as illustrated in Fig. 8, each comprises a metallic body member 41 having a threaded mounting stem 42 at one end which is centrally-drilled to receive a fluted contact pin 43. A phenolic, insulating member 44 is joined to the other end of the body member 42, and a transverse synthetic plastic diaphragm 45 is peripherally secured within said body member between it and the insulating member 44. A threaded stud terminal 46 extends through the outer end of the insulating member 44 and joins at its inner end with one end of a metallic coil spring 47 the other end of which is connected to a central electrical contact 48 in the diaphragm 45. The air chamber beneath the diaphragm 45 communicates with the outer end of the mounting stem 42 through the flutes in the contact pin 43. The contact pin 43 normally contacts the central contact 48, to make electrical contact therewith. The diaphragm 45 is adapted to move its central contact 48 out of contact with the contact pin 43 and thus open-circuit the pressure switch at a predetermined minimum value of air pressure applied through the mounting stem 42. As illustrated in Figs. 1 and 3, the threaded stud terminal 46 of the pressure actuated switches 29, 30 are interconnected by a flat metallic bridge member 49, preferably of brass, secured to said terminals as by nuts 50.

Means is provided for removably and adjustably securing the pressure switch side of the pressure block assembly 25 against the outside of the end wall 23 of the hub housing member 17. To this end, the body member 26 of the pressure block assembly is provided with side-to-side through openings 51 at each end adapted to pass machine screws 52 threadedly received in tapped openings 53 in the end wall 23 of the hub cover member 17, with the protruding portions of the pressure switches 29, 30 extending through the elongated opening 24 of said end wall. A flat spacer member 54 having an elongated opening 55 and screw holes 56 (see Figs. 3, 4) may be fitted between the pressure block assembly 25 and the end wall 23 of the hub housing member 17, for the purpose hereinafter appearing.

Means is also provided for making electrical contact with the stud terminals 46 of the pressure switches 29, 30 through the metallic bridge member 49 as the dual tire wheel rotates. To this end, the spindle 12 is axially drilled, as indicated at 54a in Fig. 1, and an electrical brush member 55a is fitted in the outer end of said drilled spindle. Since some trailer manufacturers use hollow axles and spindles, it is not always necessary to drill the spindle for installation. As illustrated in Fig. 5, the brush member 55a comprises a hollow cylindrical housing 55b of a synthetic plastic or other dielectric material integrally formed at one end with a circular flange portion 55c adapted to be seated against the outer end of the spindle 12 and held thereat by machine screws 58. Fitted within the axial opening in the housing 55b is a compressional brush spring 59 secured to the outer end of which is a carbon brush 60. The inner end of the brush spring 59 is soldered or otherwise secured to one end of an insulated electrical conductor 60a which extends through an opening in the inner end of the brush member 55a and through the axial drilled opening 54a of the spindle 12 into the interior of the tubular axle 11 where it connects with the inner terminal of an electrical feed-through insulator 61. The feed-through insulator 61 is fitted in a threaded opening 62 provided in the top of the axle 11, preferably at the center of the axle to facilitate connection in parallel with a similar pressure alarm system installed on the dual tire assembly at the other end of the axle. As illustrated in detail in Fig. 6, the feed-through insulator 61 is preferably fabricated of a length of hexagonal synthetic plastic material comprising a body portion 63 which is axially drilled to receive a threaded terminal rod 64 held in place by end nuts 65. One end of the body portion 63 is cut with a pipe thread, as indicated at 66, enabling the insulator 61 to be securely tightened within the threaded opening 62 in the axle 11, as shown in Fig. 1. The conductor 60a from the brush member 55a connects to the inner end of the terminal rod 64 and is secured in place thereat by a nut 67.

As illustrated schematically in Fig. 1, one end of an insulated conductor 68 is connected to the external end of the terminal rod 64, being secured thereon by a nut 69. The conductor 68 preferably leads to the driver's cab, where it is connected to one terminal of a warning lamp 70, the other terminal of which is connected in series with the vehicle battery 71 to vehicle ground. Thus the two pressure switches 29, 30 connected in parallel by virtue of their common ground and metallic bridge member 49, will be connected in series, through the brush member 55a and the feed-through insulator 61, with the warning lamps 70 and the vehicle battery 71. The switches 29, 30 being open-circuited when the tires D each carry at least their minimum normal air pressure, normally maintain the above-described series circuit open-circuited, so the lamp 70 will not be energized.

If either or both of the tires D should become under-inflated for any reason, however, closure of the associated one or ones of the pressure switches 29, 30 will close-circuit the above-mentioned series circuit to energize the warning lamp 70, thereby immediately warning the driver or operator of the vehicle of tire failure, even while the vehicle is in operation. Instead of using a lamp 70 as a warning device, as illustrated, the vehicle horn could be used instead, or in addition, in the series energization circuit, with an appropriate cut-out switch, to give audible indication of tire failure. In some installations, depending on the make and type of trailer on which the pressure alarm is installed, the wheel spindle may not extend outwardly of the wheel hub quite as far as is illustrated in Fig. 1. In such instances omission of the spacer member 54 will move the bridge member 49 closer to the end of the spindle and thus to the brush member 55a, so that a single size of brush member can be made to serve for installation on practically all of the various trailers currently being manufactured.

Fig. 7 illustrates in detail the improved hose adapter 39 used to connect the pressure alarm device to the tire valve stems, the same comprising a hose barb portion 72 adapted to fit into one end of the air hose 38 and be clamped therein by an outer ferrule or sleeve 73. The barb portion 72 of the adapter 39 is integrally formed with a body portion 74, preferably hexagonal in form, having a central opening 74a internally threaded to receive the standard external thread at the outer end of a tire valve stem 75. The outer end of the body portion 74 is externally threaded as indicated at 76 to threadedly receive thereon an internally threaded nut 77, the outer periphery of which is preferably hexagonal in shape to facilitate tightening thereof with respect to the body portion 74. The outer end of the nut 77 is formed with an interior annular flange portion 78 forming an interior annular shoulder against which one end of an annular rubber seal 79 seats. The other end of the seal 79 seats against the outer end of the body portion 74. The inner diameter of the seal 79 is such as to fit tightly around a standard tire valve stem, so that when the nut 77 is tightened against the body portion 74 of the adapter 39, said seal will be tightly compressed about the cylindrical wall of said valve stem to prevent leakage at the valve stem connection even if there should be leakage at the threaded end thereof. My improved hose adapter 39 is especially well suited to prevent air leakage at the tire valve stems even when the vale stem threads are chewed or otherwise damaged because of improper care in filling or testing air pressure of the tires, or because of ordinary wear in long usage.

While I have illustrated and described herein one form in which my invention can conveniently be embodied in practice, it is to be understood that this embodiment is presented by way of example only, and not in a limiting sense. In short, my invention includes all forms and modifications of the embodiment illustrated coming within the scope and spirit of the following claims.

What I claim as new and desire to secure by Letters Patent is:

1. A low pressure tire alarm for dual pneumatic tires, comprising a hub cover member adapted to be secured against the hub of a pneumatic-tired wheel in enclosing relation to the end of the wheel axle, a pair of air pressure actuated electrical switches, normally close-circuited and operative to open-circuit at a predetermined minimum air pressure, means for mounting said air pressure actuated switches in spaced relation in said hub cover member, said mounting means comprising separate air chambers operatively communicating with one each of said pressure actuated switches, air conduit means for each of said air chambers communciating with one each of the valve stems of the dual pneumatic tires for exerting individual tire pressure on each of said pressure actuated switches, a conductive element connecting said pressure actuated switches in parallel and having a contact face portion normal to the wheel axle, electrically conductive resilient brush means secured to said end of the wheel axle in coaxial relation with respect thereto and having a brush contact portion operative to contact said contact face portion, and electric alarm means in circuit with said brush means and operative to be energized when one or the other of said pressure actuated switches becomes close-circuited due to the pressure in one or the other of said dual tires falling below said predetermined minimum air pressure.

2. A low pressure tire alarm for dual pneumatic tires, comprising a hub cover member adapted to be secured against the hub of a pneumatic-tired wheel in enclosing relation to the end of the wheel axle, a pair of air pressure actuated electrical switches, normally close-circuited and operative to open-circuit at a predetermined minimum air pressure, means for mounting said air pressure actuated switches in spaced relation in said hub cover member, said mounting means comprising a pressure block having a pair of air chambers, said pressure actuated switches being secured to said pressure block and being in operative communication with one each of said air chambers, means joining said pressure block to said hub cover members, an opening in said hub cover member allowing protrusion therethrough and extension into said hub cover member of end portions of said pressure actuated switches, air conduit means for each of said air chambers communicating with one each of the valve stems of the dual pneumatic tires for exerting individual tire pressure on each of said pressure actuated switches, a conductive element connecting said pressure actuated switches in parallel and having a contact face portion normal to the wheel axle, electrically conductive brush means secured to said end of the wheel axle and having a brush contact portion extending axially of the wheel axle and operative to contact said contact face portion, and electric alarm means in circuit with said brush means and operative to be energized when one or the other of said pressure actuated switches becomes close-circuited due to the pressure in one or the other of said dual tires falling below said predetermined minimum air pressure.

3. The low pressure tire alarm as defined in claim 2 including valve stem means connected to said pressure block and communicating with one each of said pair of air chambers for supplying air under pressure, individually, to said air chambers and said dual tires.

4. The low pressure tire alarm as defined in claim 2 wherein said means joining said pressure block to said hub cover member comprises means for adjusting the distance by which said end portions of said pressure actuated switches extend into said hub cover member.

5. The low pressure tire alarm as defined in claim 4 wherein said distance adjusting means comprises a spacer member removably secured between said pressure block and said hub cover member.

6. The low pressure tire alarm as defined in claim 2 wherein said air conduit means comprises a flexible hose fitted at one end to said pressure block in communication with one of said air chambers, and provided at the other end with a fitting removably connectable with the valve stem of one of said tires.

7. A low pressure tire alarm for dual pneumatic tires, comprising a hub cover member adapted to be secured against the hub of a pneumatic-tired wheel in enclosing relation to the end of the wheel axle, a pair of air pressure actuated electrical switches, normally close-circuited and operative to open-circuit at a predetermined minimum air pressure, means for mounting said air pressure actuated switches in spaced relation in said hub cover member, said mounting means comprising a pressure block having a pair of air chambers, said pressure actuated switches being secured to said pressure block and being in operative communication with one each of said air chambers, means joining said pressure block to said hub cover members, an opening in said hub cover member allowing protrusion therethrough and extension into said hub cover member of end portions of said pressure actuated switches, air conduit means for each of said air chambers communicating with one each of the valve stems of the dual pneumatic tires for exerting individual tire pressure on each of said pressure actuated switches, a conductive element connecting said pressure actuated switches in parallel, electrically conductive brush means adapted to be secured to said end of the wheel axle, and electric alarm means in circuit with said brush means and operative to be energized when one or the other of said pressure actuated switches becomes close-circuited due to the pressure in one or the other of said dual tires falling below said predetermined minimum air pressure, said air conduit means comprising a flexible hose fitted at one end to said pressure block in communication with one of said air chambers, and provided at the other end with a fitting removably connectable with the valve stem of one of said tires, said valve stem fitting comprising a centrally drilled body member formed with a barb at one end adapted to be secured within the end of a flexible hose, and externally threaded at the other end, said other end of said body member being internally threaded to threadedly receive therein a tire valve stem, a centrally drilled cylindrical cap member threadedly received on said external thread on said other end of said body member, an annular gasket within said cap member and shoulder means in said cap member operative to compress said gasket against said other end of said body member and against a valve stem threaded in said body member for sealing said valve stem with respect to said body member.

References Cited in the file of this patent

UNITED STATES PATENTS 2,520,241      Garaci et al.      Aug. 29, 1950